Patented Dec. 27, 1932

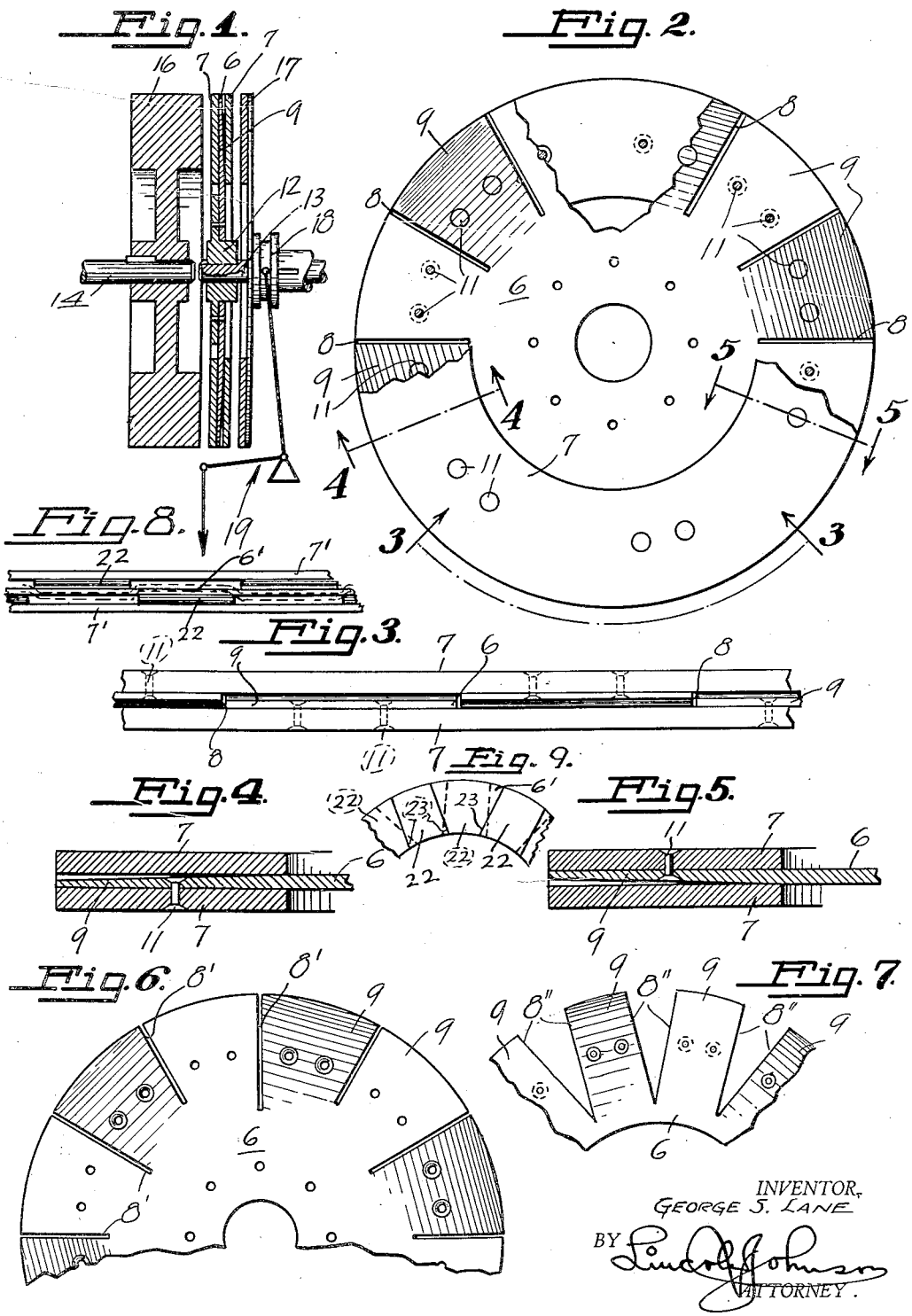

1,892,282

UNITED STATES PATENT OFFICE

GEORGE S. LANE, OF SAN ANSELMO, CALIFORNIA, ASSIGNOR TO WALLACE SHEEHAN, OF SAN FRANCISCO, CALIFORNIA, TRUSTEE

FRICTION DISK FOR CLUTCHES, BRAKES, AND THE LIKE

Application filed December 2, 1929. Serial No. 410,973.

This invention relates to brakes and clutches of the disk type.

It is the primary object of the invention to provide a frictional engagement mechanism particularly adapted for use in a clutch, in which the unequal wear of its friction disk is corrected by the reducing of pressure adjacent the outer circumference thereof, inversely to the increase of the travel of the disk adjacent and at its outer periphery whereby the resulting wear is equalized throughout the entire friction disk.

Another object of the invention is to provide a mat between two friction faces of a clutch, which mat is corrected in such a manner as to offer less resistance to pressure exerted on the friction faces, adjacent the outer periphery thereof, than at the inner periphery, whereby the pressure on the disks is decreased in proportion to the increase of travel of the friction surfaces adjacent the outer periphery.

A further object of the invention is to provide a clutch in which a mat disk has friction facings secured to the opposite faces thereof, the mat having cuts thereon extended inwardly from the periphery thereof, the segments between said cuts being recessed alternately on the opposite faces of the mat so that proportionally decreasing pressures are created on each friction facing, preventing the tight closing together of both facings at their periphery, when pressed between a pressure plate and the fly wheel of a prime mover, the surface travel multiplied by the pressure being equal at the inner and outer circumferences of the friction facings.

Other objects and advantages are to provide brakes and clutches of the friction type, that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawing wherein:

Fig. 1 is a sectional, somewhat diagrammatic, view of a clutch mechanism, with the friction disks constructed in accordance with my invention;

Fig. 2 is a face view of the disk structure of the clutch, the friction face being partly broken away to show the mat disk;

Fig. 3 is an edge view of the disk structure, viewing Fig. 2 in the direction of arrows 3—3;

Fig. 4 is a fragmentary sectional view of the disk, the section being taken on the line 4—4 of Fig. 2;

Fig. 5 is a fragmentary sectional view of the disk structure, the section being taken on the line 5—5 of Fig. 2;

Fig. 6 is a fragmental face view of the mat disk,

Fig. 7 is a fragmental face view of a corrected mat disk, with V-shaped radial cuts thereon.

Fig. 8 is an edge view of a modified embodiment of the disk structure; and

Fig. 9 is a fragmental face view of the mat of the modified disk structure.

The friction faces of the clutches are usually subjected to unequal wear. Attempts have been made to correct this unequal wear by correcting the effective frictional area or travel, but such corrections cause a disagreeable noise or "whine". Instead of corrected segmental frictional faces, full circular faces should be used without any segmental, or other correction of travel, to eliminate any uneven, partially ineffective frictional face, and the attendant whine. The use of disks of uncorrected friction surface on the other hand, causes "chatters" and an uneven distribution of wear and load.

In carrying out my invention, I provide a mat disk 6, having full, uncorrected friction facings 7 attached to the opposite facings thereof. To achieve equalized wear on these friction facings, I construct the mat 6 in such a manner that the pressure on the facings 7 is corrected without rendering any 10 part of the rubbing surface of the facings 7 ineffective. The points of the disk facing 7 nearer to the outer periphery thereof travel on a longer circular rubbing path, than points nearer to the center of the disk facing 7. The wear on a friction surface is directly proportional to the length of the path of travel of its respective points and to the pressure exerted on said surface. The mat 6 in my construction is corrected to reduce the pressure on the friction facings 7 at points of longer travel, so that the travel multiplied by the pressure at every portion of the disk will be equal, whereby the wear is equalized without causing any "whine" or chatter.

The mat 6 has cuts 8 therein extending radially inward from the outer periphery of the mat 6. The cuts 8 may be of equal length, as in Fig. 2, or may be alternately short and long cuts, as shown at 8', in Fig. 6. The cuts may be made V-shape as at 8'' in Fig. 7. The segments 9 formed between the adjacent cuts 8, are recessed, alternately, on the opposite faces of the mat 6. These alternate recesses are ground to taper outwardly, to present segments of gradually decreasing thickness toward the outer periphery of the mat.

The friction facings 7 are secured to the mat 6, preferably by rivets 11. It is to be noted that the respective rivets 11 secure only one of the facings 7 in place. The facings 7 are riveted to the smooth, full faces of the respective segments 9. The heads of the rivets 11 are counter sunk into the respective facings 7 and into the tapered wall of the recessed side of the respective segments 9, as clearly illustrated in Figs. 4 and 5.

When the unit is assembled, the facings 7 are parallel with each other, but the support on the back of each facing 7 is not equally strong throughout the entire disk, the resistance of each segment 9 decreases gradually toward the outer periphery of the facings, and in addition portions of the under faces of the facings 7 are partially unsupported opposite the beveled or recessed faces of the segments 9. When the facings 7 are subjected to pressure the portions thereof which are fully supported on the smooth faces of the segments 9, are slightly compressed; the unsupported portions of the facings 7, overlying the beveled sides of the segments 9, do not offer the same resistance to pressure exerted thereon as the said supported portions, but slightly "give" beyond a certain pressure. It is obvious that if the unsupported portions do not withstand a pressure above a certain limit, then these portions may be so arranged as to equalize the wear on the facings 7. The natural resiliency of the facings 7, maintains the friction surface in the same plane when not under pressure. The pressure on the supported portions of the facings is resisted also in accordance with the firmness of the backing segments 9, which firmness decreases toward the outer periphery of the disk. However the segments 9 are sufficiently strong to prevent the closing of the outer peripheries of the faces tightly against each other. The gradually lessened resistance to pressure toward the peripheries of the facings 7, and the resulting flexing of the facings 7, cause a decrease of pressure at points of longer rubbing surface, whereby the wear on the friction faces is equalized without necessitating the cutting away, or other correction of the rubbing surface itself. By this construction, whine is entirely eliminated.

Usually clutch chatter is due to a violent change in the effectivity of portions of the clutch surface, which is the result of transfer of the load to the outer rubbing surfaces before the same attains sufficient speed to carry the load. The correction of pressure heretofore described, by gradually decreasing pressure resistance of the mat 6, and by reason of the corresponding flexibility of the facings 7, renders rubbing surfaces at all diameters of the same effect, so that there is no tendency to pass the load from one diameter of the disk facings 7 to another. This action obviates "chatter".

In Fig. 1, I illustrate an adapation of my corrected disk structure for use in a clutch mechanism. The mat 6 is mounted on a central hub 12 which is slidably keyed on a shaft 13. Opposite the end of the shaft 13 is disposed in axial alignment therewith, another shaft 14, carrying a fly wheel 16 fixed thereon. A facing 7 on the mat 6 is in operative relation to the facing of the fly wheel 16. Opposite the other facing 7 on the other side of the mat 6 is a pressure disk 17 mounted on a slidable collar 18 on the shaft 13. Said collar 17 is moved axially by a suitable actuating mechanism diagrammatically indicated at 19.

When the pressure disk 17 is pressed against the respective facings 7, the mat with the facings 7 thereon, is pressed against the fly wheel 16. In this manner the entire frictional engagement unit is pressed between the said fly wheel 16 and the pressure disk 17. This pressure causes not only the usual frictional engagement, but it also causes the facings 7 to "give" and slightly flex toward each other at the peripheries thereof. Due to this flexing of the facings 7, the segments 9 are also flexed, and offset in the direction of the respective tapered, or recessed sides thereof, and the periphery of the mat 6 assumes a wavy shape. This resilient flexing and offsetting of the segments 9 effects the desired pressure correction, which is gradual, due to the gradually decreasing stiffness of the segments 9 toward the outer peripheries thereof. When the clutch is released, the segments 9 spring back to the original aligned positions thereof and the facings 7 are again held in parallel position relatively to each other. Resilient means may be provided to automatically move the entire assembled friction unit away from the fly wheel 16 after the clutch is released.

It is to be noted that while the herein illustration sets forth the use of the mat and the friction faces in connection with a clutch, the same may be used in connection with brakes or other frictional engagement mechanism.

It will be recognized that a particularly simple and comparatively inexpensive device is provided to effect the pressure correction on the friction faces of friction disks, without altering or changing the shape or smoothness of the friction faces, or without the use of any complex mat structure; the device is simple in construction, and positive in operation; it does not require any careful setting up or adjustment, and it positively eliminates both "whine" and "chatter", at the same time rendering the clutch highly efficient.

In the modified embodiment shown in Figs. 8 and 9, the cooperation between a mat plate 6' and the facings 7' is similar to the operation of the first mentioned disk structures. This embodiment differs from the afore described forms structurally. The mat plate 6' is not slotted. It is provided with segment mats 22, which extend radially inward from the outer periphery of the plate 6'. The segments 22 on the opposite sides of the plate 6' are arranged in staggered relation, but the side edges thereof are parallel with the central radius thru the respective segments and do not overlap each other, except at a comparatively short portion 23 thereof, adjacent the inner ends of said segments 22, as clearly shown in Fig. 9. At the points 23 where the side edges of the segments 22 intersect and overlap, the mat is rendered rigid, non-flexible. The flexibility of the mat plate 6' and the segments 22 thereon increases gradually toward the outer peripheries thereof, where it is the largest. Thus when the facings 7' are subjected to pressure the non-overlapping portions 23 of the segments 22 are forced to flex inwardly, and into offset positions relatively to their original position, whereby the plate 6' is resiliently bent into the shape indicated in dotted lines in Fig. 8. Thus the plate 6' is bent into a wavy line at its periphery. The proportion of the flexing of the mat and the resulting pressure reduction on the facings 7' is similar to the action of the first described disk construction. The spacing between the adjacent segments 22 take the place and function of the recessed sides of the first mentioned segments 9, while the V-shaped portions of the plate 6', left free of the segments 22, take the function of the slots 8", to allow the flexing of the central mat into its wavy shape.

Having thus described this invention, what I claim and desire to secure by Letters Patent is:

1. In a device of the character described, a mat disk, a continuous friction disk fastened on each face thereof, and corrections between the face of the mat disk and the underside of the friction disk to decrease the stiffness of said mat disk from the inner and toward the outer periphery in proportion to the increase of the circumferential rubbing surface of the friction disks from the inner and toward the outer peripheries thereof.

2. In a device of the character described, a mat disk, a substantially annular friction disk fastened on each face thereof, and corrections on the mat disk arranged alternately on the opposite faces thereof to decrease the mat resistance against the flexing of the respective disks under pressure, in proportion to the increase of the circumferential rubbing surface of the friction disks toward the outer peripheries thereof.

3. In a device of the character described, a mat disk, a smooth continuous friction disk fastened on each face thereof, and corrections on the mat disk arranged alternately on the opposite faces thereof to decrease the mat resistance against the flexing of the respective disks under pressure, in proportion to the increase of the circumferential rubbing surface of the friction disks toward the outer peripheries thereof.

4. In a device of the character described, a mat disk, an annular friction disk fastened on each face thereof, and segments formed on the mat disk extending from the outer periphery thereof toward its inner periphery to support said facings, each segment being formed to diminish in stiffness from its inner and toward its outer end in proportion to the increase of the circumferential rubbing surface of the friction disks.

5. In a device of the character described, a mat disk, a friction disk fastened on each face thereof, and segments formed on the mat disk extending from the outer periphery thereof toward its inner periphery, each segment being formed to diminish in stiffness from its inner and toward its outer end in proportion to the increase of the circumferential rubbing surface of the friction disks; said segments being adapted to be resiliently offset relatively to each other by the pressure exerted on the friction disks, to form a wavy mat periphery under pressure.

6. In a device of the character described, a mat disk, a friction disk fastened on each face thereof, and segments formed on the mat disk extending from the outer periphery thereof toward its inner periphery, each segment being formed to diminish in stiffness from its inner and toward its outer end in proportion to the increase of the circumferential rubbing surface of the friction disks; said segments being adapted to be resiliently offset relatively to each other within the space between the friction disks by the pressure exerted on the friction disks, to form a wavy mat periphery under pressure.

7. In a device of the character described, a mat disk, a friction disk fastened on each face thereof, and segments formed on the mat disk extending from the outer and toward its inner periphery into which the friction disks are secured, each segment presenting a plane friction disk supporting face, and an inclined face to diminish its cross section from its inner end toward its outer end in proportion to the increase of the circumferential rubbing surface of the friction disks.

8. In a device of the character described, a mat disk, a friction disk fastened on each face thereof, and circumferentially arranged segments formed on the mat disk extending from the outer and toward its inner periphery, said segments alternately presenting plane friction disk supporting faces on the opposite sides of the mat disk, and having the other faces thereof recessed to allow the resilient offset of said segments toward the center plane of the mat disk, by reason of the pressure exerted on the respective friction disks.

9. In a device of the character described, a mat disk, a friction disk fastened on each face thereof, and circumferentially arranged segments formed on the mat disk extending from the outer and toward its inner periphery, said segments alternately presenting plane friction disk supporting faces on the opposite sides of the mat disk, and having the other faces thereof recessed to allow the resilient offset of said segments toward the center plane of the mat disk, by reason of the pressure exerted on the respective friction disks, said recessed sides of the segments being tapered toward the outer ends of the segments to diminish the stiffness of said segments from the inner and toward the outer ends thereof in proportion to the increase of the circumferential rubbing surface of the friction disks.

10. In a device of the character described, a mat disk, a friction disk fastened on each face thereof, said mat disk having cuts therein extending radially inward from the periphery of the mat disk, segments formed between said cuts, said segments being relieved alternately on the opposite sides of the mat disk to allow the resilient offsetting of the segments by the pressure applied to the respective friction disks.

11. In a device of the character described, a mat disk, a friction disk fastened on each face thereof, said mat disk having cuts therein extending radially inward from the periphery of the mat disk, segments formed between said cuts, said segments being relieved alternately on the opposite sides of the mat disk to allow the resilient offsetting of the segments by the pressure applied to the respective friction disks, said relieved sides of the segments being tapered toward the outer periphery of the mat disk to diminish the stiffness of the segments from the inner and toward the outer ends thereof in proportion to the increase of the circumferential rubbing surface of the friction disks.

12. In a device of the character described, a central plate, a plurality of circumferentially spaced, radially disposed segments arranged in staggered relation on the opposite sides of the plate, the edges of the segments being parallel with the central radii thereof, and the respective side edges of the opposed segments being in partially overlapping relation adjacent the inner ends thereof; and a facing secured on the outside face of the segments on each side of the plate.

13. A friction disk comprising a plate, a friction facing on a face of the plate, the facing-supporting portions of the plate including alternate parallel and beveled surfaces, the beveled surfaces being formed to provide a space of increasing width between the beveled supporting surface portion and the facing.

14. A disk of the character described comprising a plate, a plurality of segments formed on the outer zones of the plate, and a facing on said segments, the segments being so formed that portions of the internal surface of the facing engage the entire surface of alternate segments, but the other segments form a small angle with the corresponding portions of the facing, the angle between the said last mentioned segments and the facing being such as to provide an outwardly increasing space between the respective portions of the facing and the said last mentioned segments.

15. A friction disk comprising a plate, a plurality of segments formed on the plate, and facings on the segments, the segments being beveled on the alternate sides to provide alternate spaces between the respective segments and facings, the said spaces increasing from the center to the periphery.

16. A friction disk comprising a central plate, a plurality of circumferentially spaced and radially disposed segments arranged on the opposite sides of the plate, the edges of the segments being parallel with the central radii of the respective segments; and a facing secured on the outside faces of the segments on each side of the plate to have diminishing stiffness of support from the inner toward the outer periphery thereof substantially in proportion to the increase in circumferential rubbing surface of the facings.

17. In a friction disk the combination of mat plate, and a continuous friction facing on the face of the mat plate, the mat plate surface being arranged to stiffly support certain portions of the facing against a pressure applied thereto and to leave other portions of the facing unsupported to offer lesser resistance to the said pressure, the said unsupported portions being arranged to diminish said facing resistance according to the increase of the circumferential friction area of the facing.

In testimony whereof, I have hereunto set my hand at Detroit, Michigan, this 11th day of November 1929.

GEORGE S. LANE.